United States Patent [19]

Guajaca

[11] Patent Number: 5,195,424
[45] Date of Patent: Mar. 23, 1993

[54] TAMALE STEAMER

[76] Inventor: Nora B. Guajaca, 1325.5 W. 219th St., Torrance, Calif. 90501

[21] Appl. No.: 868,838

[22] Filed: Apr. 16, 1992

[51] Int. Cl.$^5$ .............................................. A47J 36/22
[52] U.S. Cl. ...................................... 99/418; 99/415; 99/417; 99/426; 126/348; 126/369; 211/13; 211/181; 220/912
[58] Field of Search ............................ 99/410–418, 99/426, 441, 448; 126/348, 369; 211/13, 181; 220/23.83, 23.86, 574, 912

[56] References Cited

U.S. PATENT DOCUMENTS

| 134,046 | 12/1872 | Gale. | |
|---|---|---|---|
| 134,738 | 1/1873 | Dudley | 211/181 |
| 157,897 | 12/1874 | Welch | 126/369 |
| 188,036 | 3/1877 | Wren. | |
| 497,667 | 5/1893 | Jones | 211/181 |
| 542,346 | 7/1895 | Nielsen | 211/181 |
| 1,870,476 | 8/1932 | Babcock. | |
| 1,947,932 | 2/1934 | Fante | 211/181 |
| 2,021,465 | 11/1935 | Ritscher | 99/413 |
| 2,046,207 | 6/1936 | Parsons | 211/181 |
| 2,138,908 | 12/1938 | Douthitt | 99/441 |
| 2,210,521 | 8/1940 | Bemis | 220/23.83 |
| 2,467,337 | 4/1949 | Schnell | 99/413 |
| 2,552,983 | 5/1951 | Lee | 211/181 |
| 2,935,207 | 5/1960 | Miller | 211/181 |
| 3,363,544 | 1/1968 | Eriksen | 99/426 |
| 3,398,827 | 8/1968 | Laskin | 220/23.83 |
| 3,424,076 | 1/1969 | Bernatz et al. | 99/416 |
| 3,540,369 | 11/1970 | Brooks Hice | 99/441 |
| 4,271,344 | 6/1981 | Horiuchi et al. | 99/418 |
| 4,739,698 | 4/1988 | Allaire | 126/369 |
| 4,982,656 | 1/1991 | Stone | 99/403 |

FOREIGN PATENT DOCUMENTS

| 643251 | 6/1962 | Canada | 126/369 |
|---|---|---|---|
| 46571 | 6/1929 | Norway | 99/426 |
| 72941 | 12/1947 | Norway | 220/23.83 |
| 10069 | of 1894 | United Kingdom | 211/181 |

Primary Examiner—Harvey C. Hornsby
Assistant Examiner—Mark Spisich
Attorney, Agent, or Firm—Richard C. Litman

[57] ABSTRACT

There is disclosed a steamer for tamales and other comestibles having a rack capable of supporting foods being cooked therein at an inclined orientation. The rack is provided with a number of horizontal tiers or assemblies each constructed of rings joined by radially positioned spokes. Corresponding rings within each of the rack's assemblies increase in size from the top to the bottom of the rack establishing conically shaped surfaces upon which comestibles may be positively supported at an incline. The spokes connecting the rings of each of the assemblies are vertically oriented one above the other and divide the rack into separate receptacles for segregating foods during cooking. Two or more racks may be stacked within the steamer's open-topped vessel thereby increasing its cooking capacity.

16 Claims, 3 Drawing Sheets

TAMALE STEAMER

FIELD OF THE INVENTION

The present invention relates generally to a food preparation device which may be used to cook a great variety of foods but which is more particularly adapted for steaming foods such as tamales.

BACKGROUND OF THE INVENTION

American cuisine is undergoing a renaissance with the introduction of traditional ethnic foods into the mainstream diet. An example of this revival may be found in the recent popularity of Mexican food restaurants. One Mexican dish, however, relished by those who have consumed it, has not found its way onto many American's plates—tamales.

Tamales are an often highly seasoned Mexican dish of fried chopped meat and crushed peppers rolled in cornmeal dough, wrapped in corn husks and steamed. Typically, several dozen of these relatively small morsels are prepared at a given time. When placed in a pot for cooking, tamales are typically leaned against each other forming a single upright layer covering the entirety of the pot's bottom surface. Because little open space exists between the tamales during cooking, many hours are often required to steam them. Very few chefs in our fast-paced society have the patience to prepare such time consuming items.

A need presently exists for a steaming device capable of cooking food items, such as tamales, at a much faster rate. Thus, by modernizing cooking procedures, traditional foods will find a bright future in American culture.

DESCRIPTION OF THE RELATED ART

Cooking with steam is probably one of the oldest known cooking methods. Over time, developments have made cooking with steam more attractive. These developments have typically been focused on improving the apparatus employed in holding food products above the liquid used for steaming.

U.S. Pat. No. 134,046 issued Dec. 17, 1872 to Gale discloses an improved culinary steamer. This particular steamer has: a vegetable receptacle, a perforated false bottom for supporting foods above the steaming liquid, a tube running vertically down the receptacle's center for transmittal of liquids to the bottom of the device, and partitions which serve as braces for the tube and also form compartments by which different types of food may be steamed at the same time without intermixing. Since the partitions are widely spaced and have no holes for the passage of steam, this particular steamer would prove ineffective for decreasing cooking times for foods such as tamales.

U.S. Pat. No. 188,036 Mar. 6, 1877 to Wren shows another culinary steamer embodiment. A hinged door joined to one side of the steamer permits access to its interior. During steaming operations, such access would be severely restricted since food placed close to the door prevents access to that placed beyond. Additionally, cleats permanently joined to the device's inner walls for supporting perforated shelves would be difficult to clean of food debris due to their relatively inaccessible location.

U.S. Pat. No. 4,982,656 issued Jan. 8, 1991 to Stone provides a steamer adapted to be received within a conventional electric frying pan and suspended therein with its bottom wall located above the heating surface of the pan. No provision is made for retaining foods in a secured and segregated position upon the food tray for reduced cooking times.

Others have developed apparatus for securing individual food products relative to a heat source for cooking purposes. U.S. Pat. No. 1,870,476 issued Aug. 9, 1932 to Babcock, for example, provides a rotary cooker having wire food holders for supporting sausages and the like. These wire holders are joined to a complex mechanism that provides gyratory and rotary movement of the sausages around a central heating element. Additionally, U.S. Pat. No. 3,424,076 issued Jan. 28, 1969 to Bernatz, et al discloses an apparatus having a conically shaped receptacle of open framework construction. An uncooked tortilla shell may be placed within the receptacle and secured in place by a similarly shaped retainer for submersion in a heated oil for frying. Neither of these devices is particularly well suited for steaming tamales which require unrestricted steam access for maximum cooking efficiency in addition to a slight tilt from vertical to prevent food juices from settling to the bottom of their corn husk casings thereby reducing product appeal.

None of the above inventions and patents, taken either singly or in combination, is seen to describe the instant tamale steamer as claimed.

SUMMARY OF THE INVENTION

Accordingly, it is a principal object of the invention to provide a compact and portable steamer adapted to be used upon a stove or other suitable heat source for the purpose of subjecting foods placed within to the cooking action of steam.

It is an additional object of the invention to provide a steamer which can cook tamales quickly and inexpensively, thereby allowing the finished product to be offered to a consumer at reasonable cost.

It is another object of the invention to provide a steamer which may be readily taken apart for cleaning purposes in order that food deposits may be cleansed away and the device thereby kept in a sanitary condition.

It is a further object of the invention to provide a steamer which will uniformly cook the food articles placed therein.

Still another object of the invention is to provide a steamer which permits the steaming liquid to be replenished without movement of the food items within.

It is an object of the invention to provide a steamer with improved elements and arrangements thereof which is inexpensive, dependable, and fully effective in accomplishing its intended purposes.

These and other objects of the present inventive steamer will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
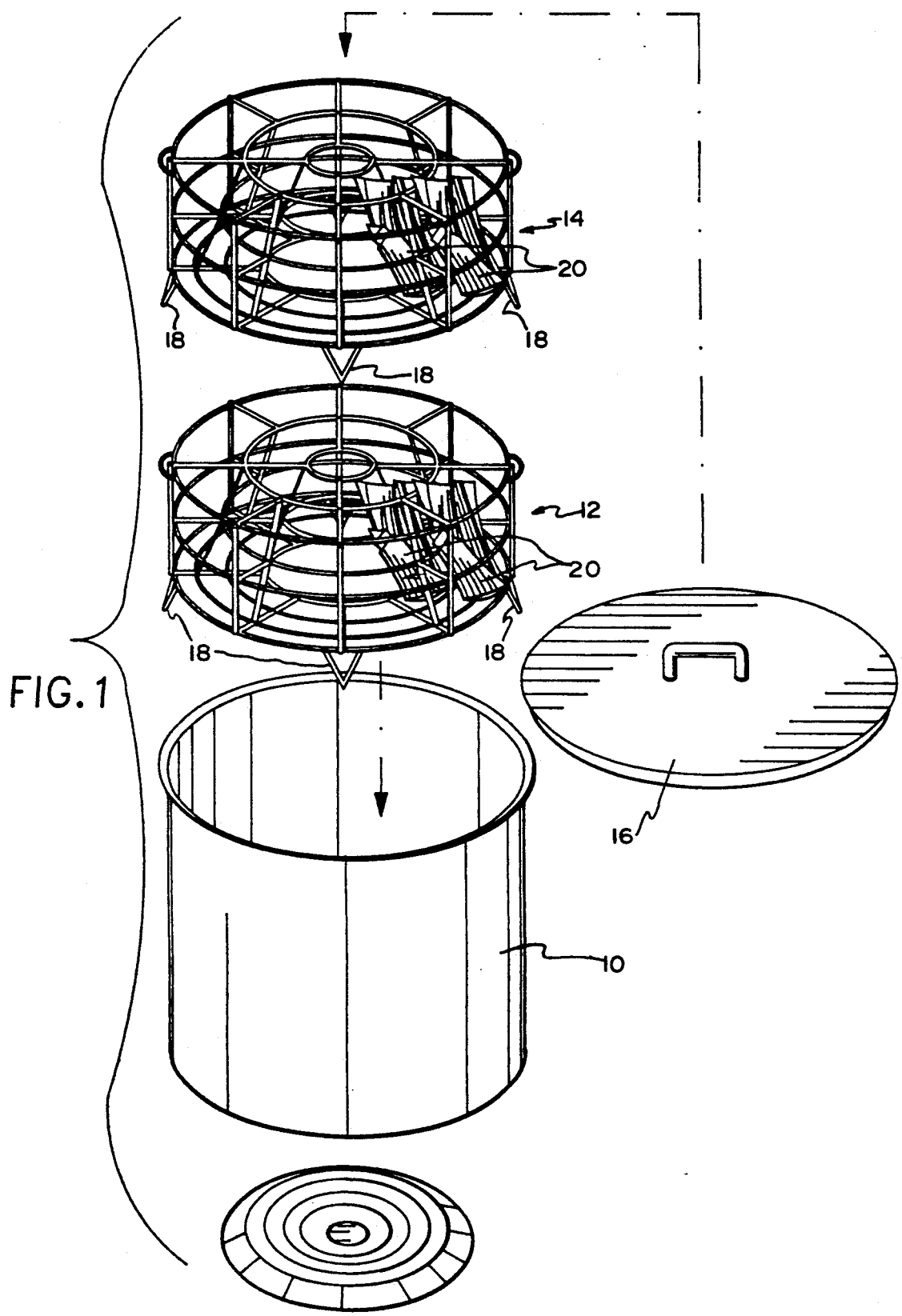
FIG. 1 is a perspective view of a steaming vessel in accordance with this invention exploded to show the relationship of two stacked steaming racks.

With reference now to the drawings and more particularly to FIG. 1 thereof, there is shown a steamer for tamales and other comestibles having an open-topped vessel 10, two steamer racks 12 and 14, and a lid 16. In the preferred embodiment of the instant tamale steamer, vessel 10 is a tall, cylindrically shaped pot with vertical walls and a flanged top for supporting lid 16. Lid 16 retains steam generated by the application of heat from element 60 to a liquid placed at the bottom of vessel 10. Steamer racks 12 and 14 have an identical configuration and may be stacked one atop the other within vessel 10 thereby increasing the steamer's cooking capacity. If small quantities of comestibles are to be steamed, however, only one of these racks need be employed for this purpose. Legs 18 joined to the bottom of steamer racks 12 and 14 flare slightly outward facilitating stacking. Legs 18 serve as guides for directing one rack into position above another as well as retainers for holding the racks together once so positioned. The primary function of legs 18, however, is to position tamales 20 or other comestibles placed within lowermost rack 12 above the liquid supplied to the bottom of vessel 10 as a source of steam.

Figure 2:
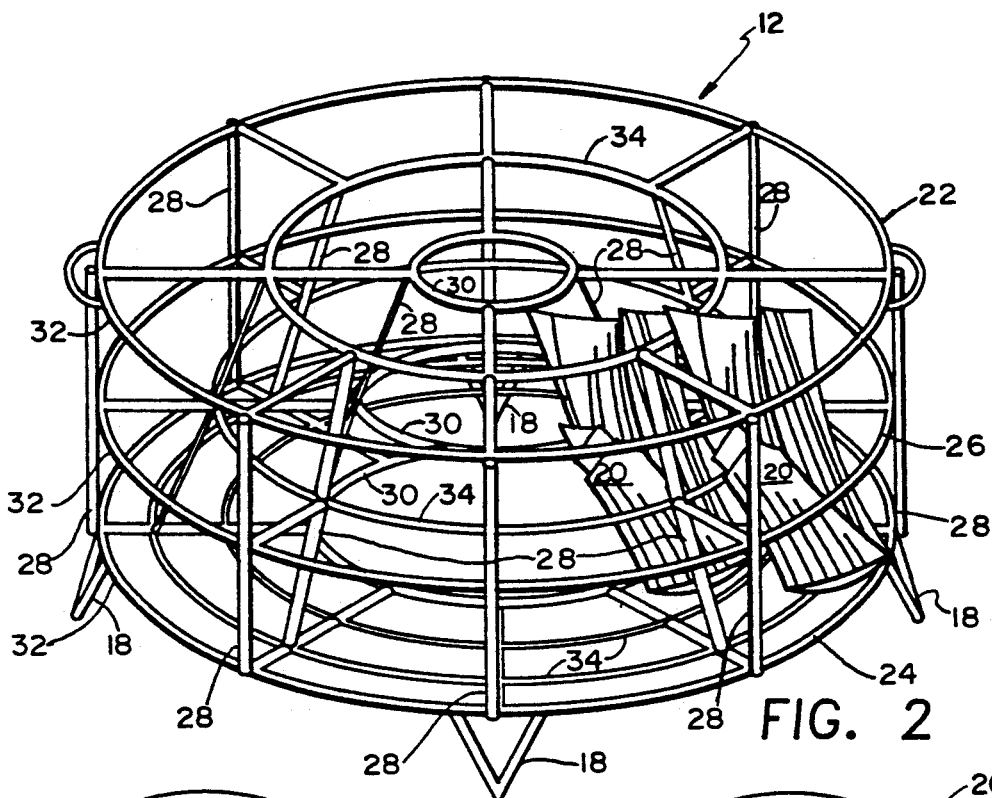
FIG. 2 is a perspective view of a steaming rack in accordance with this invention enlarged to show structural details thereof.

Referring now to FIG. 2, steamer rack 12 is shown enlarged to reveal details thereof. It may be seen that rack 12 is provided with three horizontal tiers or assemblies: upper horizontal support assembly 22 forming the top of rack 12, lower horizontal support assembly 24 forming the bottom of rack 12, and medial horizontal support assembly 26 positioned therebetween. Each assembly is constructed of several coplanar rings: innermost ring 30, outermost ring 32, and medial ring 34 positioned therebetween. Lower horizontal support assembly 24 is provided with an additional medial ring 34 to assist in retaining comestibles within rack 12 when such are placed therein. The assemblies 22, 24, and 26 are joined by columns 28, eight of which are located at the periphery of assemblies 22, 24, and 26 and are vertically positioned while an additional twelve are interiorly located and slope upwardly toward the center of rack 12. Whereas the preferred embodiment has three horizontal support assemblies, any number of medial assemblies may be added to the steamer to provide additional support for comestibles having less rigidity than the corn husk of a tamale.

Figure 3A:
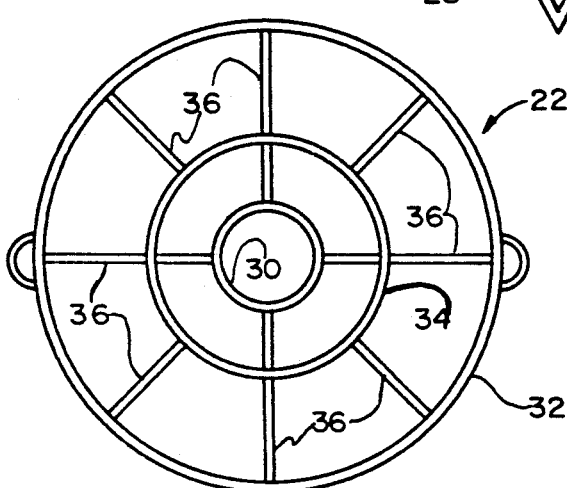
FIG. 3A is a plan view of the upper horizontal support assembly.
Figure 3B:
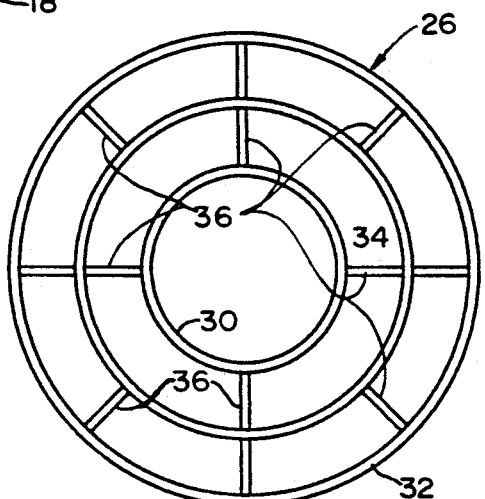
FIG. 3B is a plan view of a medial horizontal support assembly.
Figure 3C:
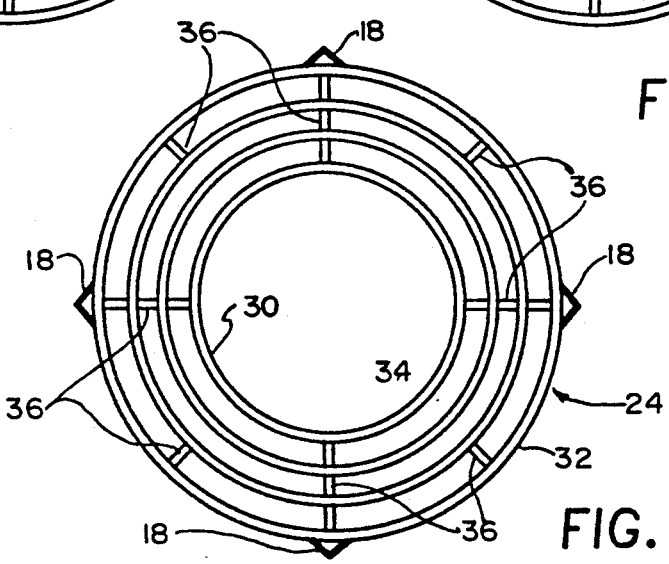
FIG. 3C is a plan view of the lower horizontal support assembly.

The configuration of each support assembly may be clearly seen in FIGS. 3A, 3B, and 3C. Radially positioned spokes 36 join the rings of each support assembly. Corresponding rings within each of the three assemblies increase in size from the top to the bottom of rack 12. When assembled, as shown in FIG. 2, these rings form conically shaped surfaces against which comestibles may be supported in an inclined orientation. Spokes 36 divide these surfaces into segments and, when vertically positioned one above the other, form individual receptacles capable of segregating foods during cooking. The embodiment of the device shown in FIG. 2 has twelve of these receptacles. Nevertheless, it is envisioned that rack 12 may be manufactured with any number of receptacles simply by providing each horizontal with additional vertically positioned spokes 36.

Figure 4:
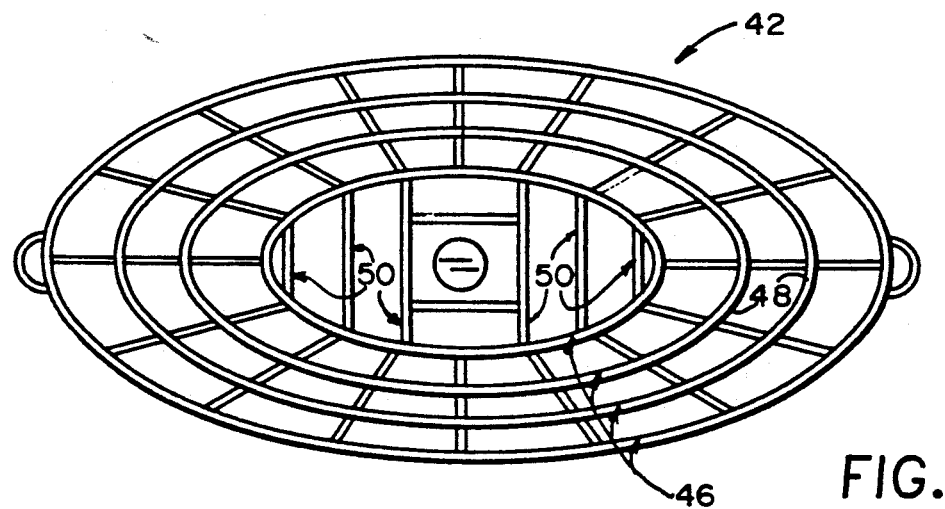
FIG. 4 is a plan view of an alternative embodiment of the steamer rack having an oval shape in accordance with this invention.
Figure 5:
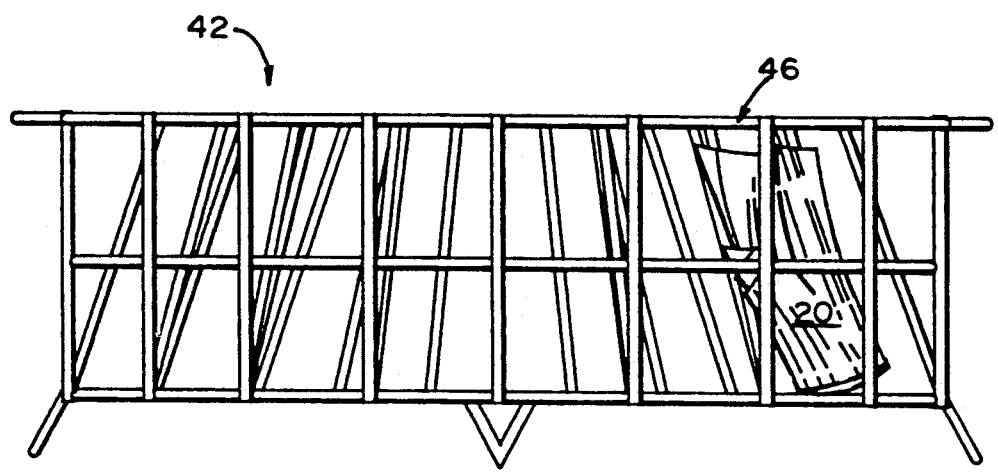
FIG. 5 is a side elevation of the steamer rack of FIG. 4.
Figure 6:
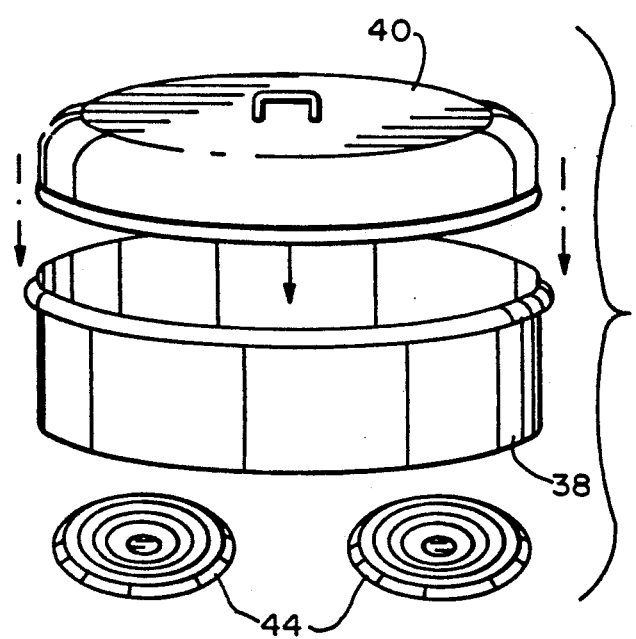
FIG. 6 is a perspective view of an alternative embodiment of a steaming vessel having an oval shape in accordance with this invention.

It is envisioned that the present inventive tamale steamer may be constructed in a variety of configurations. Referring now to FIGS. 4, 5, and 6, an alternative embodiment of the inventive tamale steamer may be viewed. In this particular embodiment, open-topped vessel 38 is shown having an oval shape. The oval shape of vessel 38 permits such to be positioned upon two heating elements 44 permitting the efficient transfer of heat energy to the steamer. The steamer's lid 40 and rack 42 are provided with similar shapes when viewed from above. Rack 42 of the alternative embodiment differs from that shown in rack 12 in slight details. First, rather than having horizontal support assemblies with circular rings, its rings 46 are of an oval configuration. Second, two medial rings 48 are provided to permit the formation of a larger number receptacles for segregating food while cooking. Finally, additional inclined receptacles are provided within the center portion of the rack by the addition of braces 50.

It has been contemplated that the inventive tamale steamer may be constructed from aluminum or other suitable metallic substance or combination of substances. Also, individual components of the device may be joined by weld or any other suitable means known in the art.

It is to be understood that the instant invention is not limited to the embodiments described above, but encompasses any and all embodiments within the scope of the following claims.

I claim:

1. A steamer for tamales and other comestibles, comprising:
   an open-topped vessel;
   a plurality of steamer racks fitted within said vessel, each said rack having a plurality of receptacles for retaining comestibles placed therein at an inclined orientation and adapted to be stacked one rack upon another, wherein each said steamer rack includes:
   an upper horizontal support assembly;
   a lower horizontal support assembly positioned beneath said upper horizontal support assembly;
   at least one medial horizontal support assembly positioned between said upper and lower support assemblies, wherein each of said upper, lower and medical support assemblies includes:
   a plurality of rings, each of said rings positioned in the same plane, said rings including:
   an innermost ring;
   an outermost ring surrounding said innermost ring;
   at least one medial ring positioned between said innermost and said outermost ring;
   a plurality of spokes joining said rings; and
   means for closing said vessel thereby retaining steam within.

2. The steamer according to claim 1 constructed of aluminum.

3. The steamer according to claim 1 wherein said vessel is circular in shape.

4. The steamer according to claim 1 wherein said vessel is ovally shaped.

5. The steamer according to claim 1 wherein each of said upper, medial, and lower support assemblies are joined by a plurality of columns.

6. The steamer according to claim 1 wherein said innermost ring of each of said support assemblies increases in size from the upper horizontal support assembly to the lower horizontal support assembly, whereby a conically shaped surface is formed upon which comestibles may be supported at an inclined orientation.

7. The steamer according to claim 1 wherein said medial rings of each of said support assemblies increase in size from the upper horizontal support assembly to the lower horizontal support assembly, whereby at least one conically shaped surface is formed upon which comestibles may be supported at an inclined orientation.

8. A steamer for tamales and other comestibles, comprising:
   an open-topped vessel of circular shape;
   at least one steamer rack fitted within said vessel, each said rack including:
   a plurality of horizontally positioned support assemblies, each of said assemblies having a plurality of openings through which comestibles may be placed, each said assembly further including:
   a plurality of rings, each of said rings positioned in the same plane, said rings including:
     an innermost ring;
     an outermost ring surrounding said innermost ring; and,
     at least one medial ring positioned between said innermost and outermost ring; and,
   a plurality of spokes joining said rings; and,
   a plurality of columns joining said support assemblies.

9. A steamer rack for tamales and other comestibles adapted to be fitted within a steaming vessel having receptacles for retaining comestibles placed therein at an inclined orientation and adapted to be stacked one rack upon another when in use further comprising:
   an upper, medial and lower support assembly, connected together such that each assembly is generally parallel to the other two each of said assemblies including:
   innermost, medial and outermost concentric rings, each of said rings positioned within the same plane:
   a plurality of spokes joining said rings and; the outermost ring of each assembly having generally the same diameter.

10. A steamer rack according to claim 9 further comprising:
    wherein each of said upper, medial and lower support assemblies has a plurality of openings through which comestibles may be placed.

11. The steamer rack according to claim 10 wherein each of said upper, medial, and lower support assemblies are joined by a plurality of columns.

12. A steamer rack according to claim 10 wherein said innermost ring of each of said support assemblies increases in size from the upper horizontal support assembly to the lower horizontal support assembly, whereby a conically shaped surface is formed upon which comestibles may be supported at an inclined orientation.

13. The steamer rack according to claim 10, wherein said medial rings of each said support assemblies increase in size from the upper horizontal support assembly to the lower horizontal support assembly, whereby at least one conically shaped surface is formed upon which comestibles may be supported at an inclined orientation.

14. The steamer rack according to claim 10 constructed of aluminum.

15. The steamer rack according to claim 10 wherein each of said support assemblies is circular in shape.

16. The steamer rack according to claim 10 wherein each of said support assemblies is ovally shaped.

* * * * *